3,040,004
N-IMINOPYRROLIDONES AND POLYMERS THEREFROM

Samuel A. Glickman, Easton, and Edgar Shelley Miller, Bethlehem, Pa., assignors to General Aniline & Film Corporation, New York, N.Y., a corporation of Delaware
No Drawing. Filed Apr. 4, 1958, Ser. No. 726,341
17 Claims. (Cl. 260—78)

The present invention relates to certain novel N-iminopyrrolidones and a process of preparing them which have been found to be particularly useful in the polymerization of 5- and 6-membered lactams such as pyrrolidone and piperidone and to a novel method for the polymerization of such 5- and 6-membered lactams employing the novel N-iminopyrrolidone of this invention as chain initiators and to the novel type of polymer thus produced.

The polymerization of a lactam, such as pyrrolidone, proceeds via a ring-chain polymerization to give polyamides of 4-aminobutyric acid. Thus:

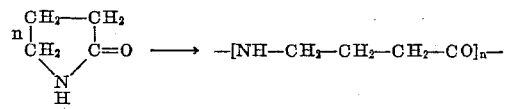

The recurring unit is one which might hypothetically arise in the condensation polymerization of 4-aminobutyric acid. However, early investigators, namely Gabriel (Berichte 32, 1266 (1899)) and Schotten (Berichte 21, 2240 (1880)), observed that 4-amino-butyric acid and 5-aminovaleric acid failed to undergo intermolecular condensation and yielded only the five and six membered lactams. The first disclosure of such polyamides was that of U.S.P. 2,638,463 (W. O. Ney, W. R. Nummy and C. E. Barnes, May 12, 1953), involving the polymerization of pyrrolidone in the presence of an alkaline polymerization catalyst.

While useful polymers are obtained by the process described in the Ney, Nummy and Barnes patent, No. 2,638,463, considerable difficulty is encountered in obtaining these polymers in satisfactory yields; and, also, in the production of polymers having relatively high molecular weights. Patent No. 2,739,959 of Ney and Crowther, which, in Example I, discloses that only a small yield of low molecular weight polymer may be obtained when an alkaline polymerization catalyst is employed as the sole promoter of the polymerization of pyrrolidone, discloses effecting the alkaline polymerization of the lactams in the presence of a small amount of an acyl compound, as an activator for the alkaline polymerization catalyst; and preferably, carrying out the polymerization of a lactam while dispersed in an anhydrous hydrocarbon non-solvent therefore, in order to increase the yield and molecular weight of the polymer. The specific activators described in Patent No. 2,739,959, as having the property of increasing the rate of polymerization of lactams having 5- and 6-membered rings, are acyl pyrrolidones, acyl dipyrrolidones, organic peroxides, anhydrous lactones and alkyl esters. The Ney and Crowther patent discloses the use of these acyl compounds as activators for the alkaline polymerization catalyst.

We have now found that the novel N-iminopyrrolidones of the present invention are capable of acting as chain initiators in the alkaline catalyzed polymerization of 5- and 6-membered lactams (e.g. pyrrolidone and piperidone). This particular class of amidines has the roll of initiating chain growth whereby a novel type of polymer is produced.

The class of novel N-iminopyrrolidones which we have found to be useful for initiating the alkaline catalyzed polymerization of pyrrolidone and piperidone are the novel compounds of the 3 general structures below.

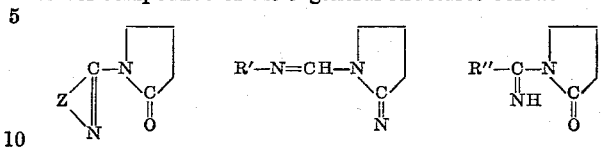

where Z is

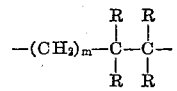

$m$ is 1, 2 or 3; R is lower alkyl (1–4 carbon atoms); R' is aryl; R'' is aryl, aralkyl and lower alkyl (1–4 carbon atoms).

PREPARATION OF N-IMINOPYRROLIDONES

The above structures are formed by the condensation of pyrrolidone with imido ethers shown below:

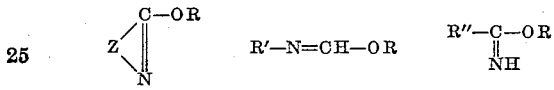

wherein R is a lower alkyl group of 1 to 4 carbon atoms and Z, R' and R'' are as defined above.

These condensations proceed with the elimination of ROH, the alkoxy radical contributed by the imido ether and the hydrogen from the pyrrolidone. Thus:

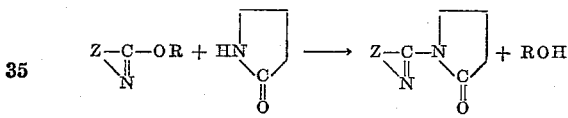

The N-iminopyrrolidones referred to above are novel amidines and the reaction of an imido ether with an amide function, that present in pyrrolidone, is also novel.

The reaction between imido ethers and pyrrolidone is carried out at elevated temperatures of 100 to 150° C., accompanied by the removal of the alcohol by means of a short distillation column. The removal of alcohol and the attainment of a given temperature may be facilitated by carrying out the reaction at reduced pressure. The exact conditions will in large measure depend on the properties of the imidic ethers employed.

The lactim-pyrrolidones, prepared by the reaction of lactim ethers with pyrrolidone, are particularly effective chain-initiators in the alkaline catalyzed polymerization of pyrrolidone and piperidone.

The following examples illustrate the novel process and novel types of N-iminopyrrolidones of the present invention.

Example I

A 100 ml. flask, equipped with a capillary inlet for the introduction of nitrogen, was charged with 21 grams (0.25 mole) of pyrrolidone and 25 grams (0.25 mole) of butyrolactim methyl ether, B.P. 49–50° at 50 mm., $n_D^{25}$ 1.4375, prepared by the reaction of pyrrolidone and dimethyl sulfate according to Benson and Cairns, J.A.C.S. 70, 2115 (1948). The contents was heated to 140° and then maintained at 140–150° C. for 6 hours. During the interval the methanol formed in the condensation was removed by distillation through the attached 18 inch Vigreaux column. The reaction mixture was distilled at reduced pressure and the fraction collected boiling at 90–95° C. at 0.2 and 0.3 mm. amounted to 32.6 grams.

This represents a yield of 86% of N-(2-butyrolactim)-2-pyrrolidone, with the structure below:

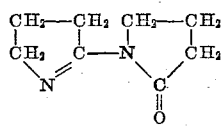

The distillate solidified on standing to give a solid melting at 60° C. An aliquot was recrystallized from low boiling petroleum ether to yield crystals, M.P. 60.0–60.5° C. Elemental quantitative analysis was in agreement with the formula $C_8H_{12}N_2O$ of the N-lactim-pyrrolidone.

Example II

A 100 ml. flask, equipped with a capillary inlet for the introduction of nitrogen, was charged with 23 grams (0.27 mole) of pyrrolidone and 38 grams (0.30 mole) of caprolactim methyl ether, prepared according to the procedure of Benson and Cairns, J.A.C.S. 70, 2115 (1948). The flask was attached to an 18 inch Vigreaux column and heated at 145–150° C. at a reduced pressure of 250 mm. for 6 hours. The methanol formed during this interval was removed. The reaction mixture was distilled at 0.1 mm. and the fraction boiling at 78–81° C. was collected as the imino-pyrrolidone. There was obtained 23.9 grams of N-(2-caprolactim)-2-pyrrolidone which gave the correct elemental analysis for $C_{10}H_{14}N_2O$. The distillate obtained above crystallized on standing and was re-crystallized from low boiling petroleum ether, M.P. 56.5–58.5° C.

Example III

A 100 ml. flask, equipped with a capillary inlet for the introduction of nitrogen, was charged with 21 grams (0.25 mole) of pyrrolidone and 37 grams (0.25 mole) of ethyl N-phenylformimidate, prepared by the procedure of Roberts, J.A.C.S. 71, 3848 (1948). The flask was attached to a short distilling column and gradually heated to 140° C. at a reduced pressure of 250 mm. During the course of 7 hours at 140–150° at 250 mm. the ethanol formed was removed. The reaction mixture was then distilled at very low pressure to give a good yield of N-(N-phenylformimino)-2-pyrrolidone, $C_{11}H_{12}N_2O$.

Example IV

A 100 ml. flask, equipped with a capillary inlet for the introduction of nitrogen, was charged with 21 grams (0.25 mole) of pyrrolidone and 37 grams (0.25 mole) of benzimido ethyl ether, prepared from benzonitrile, ethanol and dry hydrogen chloride according to the method of Pinner for the preparation of imidoethers by the reaction of a nitrile with an alcohol and dry HCl first reported by Pinner Berichte 16, 1654 (1883) and 17, 178 (1884) and described in Organic Syntheses Collective Volume 1, pages 5 to 7, by Gillman and Blatt, 2nd Edition, John Wiley & Sons. The flask was heated to 150° C. at atmospheric pressure and the ethanol formed was distilled through a 6 inch Claisen head column in the course of 6 hours. The reaction product was isolated by vacuum distillation yielding N-(benzimino)-2-pyrrolidone, $C_{11}H_{12}N_2O$.

Example V

A 100 ml. flask, equipped with a capillary inlet for the introduction of nitrogen, was charged with 26.5 grams (0.30 mole) of pyrrolidone and 39 grams (0.30 mole) of n-valerimido-ethyl ether, prepared from n-valeronitrile, ethanol and dry hydrogen chloride according to the method of Pinner (supra). The flask was attached to a 6 inch Vigreaux column and heated at 125°–130° for 8 hours at atmospheric pressure, accompanied by the distillation of the ethanol formed. Distillation of the reaction mixture yielded N-(valerimino)-2-pyrrolidone with the molecular formula $C_9H_{16}N_2O$.

POLYMERIZATION OF LACTAMS EMPLOYING N-IMINOPYRROLIDONE AS CHAIN INITIATORS

The polymerization of 5- and 6-membered lactams using the above described novel N-iminopyrrolidones as chain initiators is described in detail below. We have found that as a consequence of the use of these N-iminopyrrolidones as chain initiators in the alkaline catalyzed polymerization of 5- and 6-membered lactams that the group $$R'N=C-\underset{R}{|}$$

(wherein R=H, aryl, aralkyl or lower alkyl (1–4 carbon atoms) and R'=H or aryl and R and R' together may represent an alkylene group of 3 to 5 carbon atoms) of the N-iminopyrrolidone enters into the molecule of the polymer which is produced so that a novel polymer of the following general formula is obtained

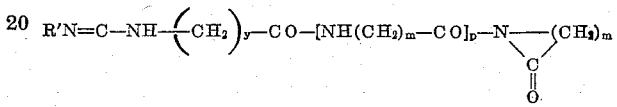

wherein $y$ is 3, 4 or 5; $m$ is 3 or 4; and $p$ an average integer of from 1 to 1000.

The general conditions and factors utilized for polymerizing 5- and 6-membered lactams, pursuant to the present invention, may be those mentioned in U.S. Patent No. 2,739,959, except for the presence of the N-iminopyrrolidone described in the foregoing, as the chain initiator for the polymerization, in place of the activators specified in that patent. In general, the method of effecting polymerization of 5- and 6-membered ring lactams, by the process of the present invention is as follows:

Initially, there is the preparation of an anhydrous solution of the alkali pyrrolidone in pyrrolidone. The alkali pyrrolidone usually employed is sodio or potassio pyrrolidone, and may be obtained via the reaction of pyrrolidone with sodium and potassium metal or the respective hydroxides. In the latter case, it is essential to remove the water formed thereby as rapidly as possible. The concentration of the alkali pyrrolidone employed in many instances may vary from 0.5 to 5.0 mole percent (percentages based on pyrrolidone), and may range from 0.1 to 10.0 mole percent. In series of experiments, optimum yields were obtained with about 1.25 mole percent of alkali pyrrolidone. The role of the alkali pyrrolidone is that of a catalyst and serves as a source of pyrrolidone anions.

The amount of chain initiators employed in many instances may vary from 0.1 to 10.0 mole percent (percentage based on pyrrolidone). The concentration of chain initiator chosen, will depend on the conversion desired, and the molecular weight sought. The rate of the polymerization will depend, to a large extent, on the molar amount of chain initiator employed, the higher rates obtained by the use of greater amounts of chain initiator. The polymerizations may be chain initiated at temperatures from 25° C. to 65° C. and are accompanied by a mild exothermic reaction.

In a bulk or mass polymerization, the addition of the chain initiator is followed by a thickening of the solution and gradual solidification of the mixture. The toughness of the cake will, obviously, depend on the extent of the conversion and will be dependent on the times involved and amounts of chain initiators used.

The polymerization employing the foregoing chain initiators may be conducted on a dispersion of pyrrolidone, and the alkali pyrrolidone in a non-solvent for the pyrrolidone. Applicable non-solvents fall in the class of saturated and olefinic aliphatic alicyclic hydrocarbons, i.e. pentane, hexane, heptane, cyclohexane, pentene, cyclohexene, etc. The amount of non-solvent frequently employed is 1 to 3 parts of non-solvent per unit weight of pyrrolidone but is subject to wide variation.

The physical state of the resulting polymer obtained, via a dispersion polymerization may vary from a thick curd to a fine powder, depending on conversion desired, ratio of non-solvent and type as well as rate of agitation.

For the purposes of comparison, there are given below, as examples A and B, illustrations of the prior art polymerization of highly purified pyrrolidone, from the same batch, and purified in the same manner as the pyrrolidone used in the examples appearing later in the specification of the process of the present invention:

Example A

A 500 cc. glass flask was charged with 100.0 grams (1.18 moles) of highly purified pyrrolidone. There is added 1.0 gram of potassium hydroxide flakes of 83% assay, the system immediately placed under a reduced pressure of 10 mm. and rapidly heated to the reflux point of 120 to 125° C. The vapors were condensed in a vertical reflux condenser, maintained at a jacket temperature of 75° C., thus permitting the return of the pyrrolidone and, at the same time, effecting the removal of water. After one hour at the reflux point, the reaction mixture in the still pot was cooled and the clear, colorless solution of potassio pyrrolidone in pyrrolidone allowed to stand for 24 hours at room temperature to the exclusion of atmospheric moisture and carbon dioxide. During the 24 hour period, the mixture became turbid and a scant amount of solid was deposited. The mixture was treated with 400 grams of distilled water, the solid filtered and thoroughly washed with water. The dried polymer weighed 0.6 gram, representing a conversion of 0.6%. The material was of low molecular weight, as indicated by the relative viscosity of a 1% solution in meta cresol.

Example B

This example is an illustration of an alternate polymerization of highly purified pyrrolidone, and closely follows Example 1, of U.S. Patent No. 2,739,959, which is also an illustration of prior art polymerization of pyrrolidone.

A 500 cc. glass flask, equipped for vacuum distillation, was charged with 120.0 grams of highly purified pyrrolidone. There is added 1.0 gram of potassium hydroxide flakes of 83% assay. The system was immediately placed under a reduced pressure of 1.0 mm. and rapidly heated to effect the distillation at 90 to 100° C. of 20 grams of pyrrolidone and water. The resulting clear, colorless solution in the still pot constitutes a solution of potassio pyrrolidone in pyrrolidone. The solution was allowed to cool to room temperature and stand for 24 hours to the exclusion of atmospheric moisture and carbon dioxide. During this 24 hour period the mixture became turbid and a scant amount of solid was deposited. The contents was treated with 400 grams of distilled water, the solid filtered and thoroughly washed with water. The dried polymer weighed 0.5 gram, representing a conversion of 0.5%. The material was of low molecular weight as indicated by the relative viscosity of a 1% solution in meta cresol.

The details of the present invention will be apparent to those skilled in the art, from the following specific examples, of preferred methods of practicing the same:

Example VI

A 300 cc. glass flask was charged with 50 grams (0.59 mole) of highly purified pyrrolidone. There was then added 0.5 gram of potassium hydroxide flakes of 83% assay, and the mixture immediately placed under a reduced pressure of 10 mm. and rapidly heated to the reflux point of 120–125° C. The vapors were condensed in a vertical reflux condenser, maintained at a jacket temperature of 75° C., thus permitting the return of the pyrrolidone, and, at the same time effecting the removal of water. After 1 hour at the reflux point, there was obtained a clear colorless solution of potassio pyrrolidone. To this solution at 50° C. was added 0.5 gram (0.0033 mole) of N-(2-butyrolactim)-2-pyrrolidone, prepared by the procedure of Example I above. The molar concentration of the chain initiator is 0.55% based on the pyrrolidone. In the course of 5 minutes the mixture became cloudy and thickened to a gel in 25 minutes. Precautions were taken to exclude moisture and carbon dioxide. After 18 hours, the hard mass was removed from the flask and was dissolved with stirring in 350 cc. of 6 molar hydrochloric acid. Following neutralization with ammonia, filtration of the resulting suspension, thorough washing with water and drying, there was obtained 39.5 g. of white solid. This represents a conversion of 79% to polyamide of relative viscosity 2.4 (1 g. in 100 ml. of m-cresol). The thus obtained polymer M.P. 253–255° C. has the following formula:

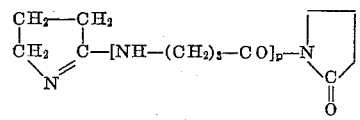

Example VII

A solution of potassio pyrrolidone in 50 grams (0.59 mole) of pyrrolidone was prepared as described in Example VI. To this solution at 50° C., was added 0.5 gram (0.0028 mole) of N-(2-caprolactim)-2-pyrrolidone, prepared by the procedure of Example II above. The molar concentration of the chain initiator is 0.5% based on the pyrrolidone. In the course of 5 minutes the solution became cloudy and in 25 minutes had formed a firm gel. Precautions were taken to exclude moisture and carbon dioxide. After 18 hours, the mass was removed from the flask and was dissolved with stirring in 200 cc. of 6 molar hydrochloric acid. The viscous solution was neutralized with ammonia, and the resulting solid thoroughly washed with water, filtered and vacuum oven dried. There was obtained 35.6 grams of white solid polyamide, representing a conversion of 71%. The material had a M.P. of 252–254° C. with a relative viscosity of 2.276 as a 1% solution in m-cresol.

Example VIII

A solution of potassio pyrrolidone in 50 grams (0.59 mole) of pyrrolidone was prepared as described in Example VI. To this solution at 50° C., was added 0.1 gram (0.00056 mole) of N-(2-caprolactim)-2-pyrrolidone, prepared by the procedure of Example II above. The molar concentration of the chain initiator is 0.1% based on the pyrrolidone. The mixture became turbid in the course of 5 minutes and gradually formed a dry gel in the next 18 hours. The material was easily removed from the flask, slurried well in water and methanol and dried in vacuum oven. There was obtained 13.3 g. of polyamide for a conversion of 26.6%. The material had a M.P. of 253–255° C. and a relative viscosity of 4.41 as a 1% solution in m-cresol.

In the foregoing Examples VI and VIII inclusive, the amidine employed as the chain initiator was pre-formed, and added to the solution of potassio pyrrolidone in pyrrolidone. However, the N-imidopyrrolidone which is used as the chain initiator, may be formed in situ by adding imido ether to the solution of potassio pyrrolidone in pyrrolidone under special conditions. This method of operation is described in the following example.

Example IX

A 300 cc. glass flask was charged with 50 grams (0.59 mole) of highly purified pyrrolidone. There was added 0.75 g. of potassium hydroxide flakes of 83% assay, the system immediately placed under a reduced pressure of 10 mm. and rapidly heated to the reflux point of 120–125° C. The vapors were condensed in a vertical reflux condenser, maintained at a jacket temperature of 75° C., thus permitting the return of the pyrrolidone and at the same time effecting the removal of water. After one-half hour at the reflux point, the reaction mixture in the flask was cooled to 100° C. and dry nitrogen admitted to achieve atmospheric pressure. There was then added 2 grams of O-methyl caprolactim (0.0158 mole), prepared according to the directions of Benson and Cairns in Journal of the American Society 70, 2115 (1948). The system was again placed under reduced pressure and allowed to cool from 100° C. of its own accord. At 57° C., the solution became turbid and in the course of 30 minutes became a dry gel. After 18 hours the resulting hard white mass was dissolved with stirring in 100 ml. of 6 molar hydrochloric acid. The viscous solution was neutralized with concentrated ammonia, the resulting white solid carefully washed with water and methanol and dried in a vacuum oven. The white polyamide was obtained in 63.4% conversion with a M.P. of 252–254° C. and a relative viscosity of 1.46 for a 1% solution in m-cresol.

In the foregoing example the molar concentration of O-methyl caprolactim was 2.62% and its use leads to the formation in situ of N-(2-caprolactim)-2-pyrrolidone, whose ability to act as a chain initiator had been shown in Examples VII and VIII. The role of the imido ether is therefore that of a chain initiator precursor.

*Example X*

The following example illustrates the employ of heptane as the medium for the non-solvent suspension polymerization of pyrrolidone using a cyclic amidine, N-(2-caprolactim)-2-pyrrolidone as the chain initiator.

A 500 cc. flask was charged with 120 grams of highly purified pyrrolidone. There is added 1.5 grams of potassium hydroxide flakes of 83% assay and the system immediately placed under a reduced pressure of 10 mm. In rapid fashion, at total take-off there was distilled 20 grams of pyrrolidone at 125° C. to ensure the removal of water. The remaining 100 grams of a solution of potassio pyrrolidone in pyrrolidone was cooled to 30° C.

The solution from above was added to 200 grams of anhydrous heptane in a suitably equipped reaction vessel. To the rapidly agitated mixture at 30° C. was added 1.0 gram (.0056 mole) of N-(2-caprolactim)-2-pyrrolidone, prepared by the procedure of Example II above. The molar concentration of the chain initiator is 0.5% based on the pyrrolidone. The solution temperature rose slightly to 33° C. as the nature of the suspended liquid changed to that of a soft curd. In the course of 48 hours' stirring the mixture gradually became a suspension of finely divided white solid. The solid was filtered, triturated well with methanol to remove excess pyrrolidone, washed thoroughly with water to remove alkali and dried in a vacuum oven at 80° C. There was obtained 48.5 g. of polyamide, M.P. 252–254° C. for a conversion of 48.5%. The relative viscosity of a 1% solution in m-cresol was 2.85.

*Example XI*

Charge a 500 cc. flask with 99 grams (1.0 mole) of highly purified piperidone. Add 1.5 grams of potassium hydroxide of 83% assay; place the system immediately under a reduced pressure of 5 mm. and rapidly heat to the reflux point (120–125° C.). Condense the vapors in a vertical reflux condenser maintained at a jacket temperature of 75° C., thus permitting the return of piperidone and, at the same time effecting the removal of water. After 1 hour at reflux, the mixture is cooled to 50° C. and treated with 1.8 g. (.01 mole) of N-(2-caprolactim)-2-pyrrolidone, corresponding to 1 mole percent of chain initiator. The solution became turbid in one hour and in the course of 24 hours had formed a hard white mass. During this time precautions were taken to exclude moisture and carbon dioxide. The solid is dissolved in 400 grams of 90% formic acid by stirring over a 24 hour period. The viscous solution is poured onto 2000 g. of ice and water and the precipitated solid filtered, thoroughly washed and dried in a vacuum oven at 80° C. The polyamide thus obtained is believed to possess the formula:

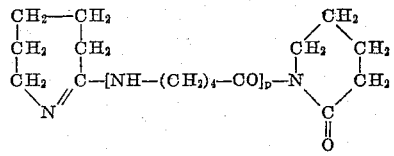

While an N-pyrrolidonyl, or N-piperidonyl group appears to be the usual chain-terminating group of the polymers obtained, pursuant to the present invention, it will be apparent to those skilled in the art, that the polymer chains may be otherwise terminated, for instance, by the formation of the acids and the metal and ammonium salts thereof, as well as esters and amides, which may arise by reaction of the active polymer intermediate with alkaline compounds, hydroxyl-containing compounds or amines. Therefore, the polymers obtained, pursuant to the present invention, may, generically, be represented by the following general formula:

$$\underset{(CH_2)_y}{\underset{N}{\overset{C}{\diagdown}\!\!/}}C-\left[NH(CH_2)_m-\overset{O}{\underset{\|}{C}}\right]_p-A$$

where "A" equals N-pyrrolidonyl, N-piperidonyl or

—NH(CH$_2$)$_m$—COY radical, where *m* equals 3 or 4; and "Y" represents oxymetal, hydroxyl, alkoxy, aryloxy, aralkoxy, oxyammonium, amino, alkylamino or arylamino.

As samples of specific reagents, which may be employed to terminate the polymer chains, otherwise than in a pyrrolidonyl or piperidonyl radical, may be mentioned water, sodium hydroxide, sodium methylate, methanol, ethanol, phenol, ammonia, ethylamine, aniline, diethanolamine. Reaction of the free polymer acid with alkaline agents such as metal hydroxides and amines gives the respective salts. The various terminations proceed through scission of the terminal pyrrolidone ring, or one of the polyamide linkages, particularly the linkage between terminal pyrrolidonyl linkage and the carbonyl grouping linked thereto. Termination of the polymer chain by means of an ester, such as

—NH—CH$_2$CH$_2$CH$_2$COOCH$_3$ may be accomplished by treatment of the polymer intermediate, with methanol. In a similar fashion, treatment of the polymer obtained in the hexane suspension polymerization with an amine, such as aniline, yields an amide terminated function, of the type

—NH—CH$_2$CH$_2$CH$_2$CONHC$_6$H$_5$

Hydrolysis of the terminal ring may be accomplished by treating the alkaline containing white solid, obtained in the polymerization, with water at 75–80° C. for one hour. The resulting product is terminated by a

—NHCH$_2$CH$_2$CH$_2$COOK group. Conversion to the free acid, and, consequently to the other metal and ammonium salts, is accomplished by acidification and respective action of alkalizing agents.

The polymeric products of the present invention are, as indicated, polyamides of the nylon-4 type from pyrrolidone, or nylon-5 from piperidone; and, as such, are useful in the arts as in many applications of nylon. In particular, the products of the present invention, particularly, those of relatively high molecular weight, e.g., products which have a relative viscosity of about 2.5 or higher, as a 1% solution in the m-cresol, are useful for the production of fibers for textile and other uses—e.g., as insulating blankets, etc. Fibers have been successfully produced from products of the present invention, by drawing from a melt and spinning from solutions, such as solution in formic acid, followed by evaporation of solvent. Useful films, having a wide variety of applications, may also be produced from the products of the present invention by melt-extrusion, by film-casting from solutions, such as a formic acid solution, glycolic or lactic acid solution, followed by removal of the solvent. Such films are useful in numerous applications, including electrical applications, as an insulator; as a base for industrial tapes; as a lining material or glass replacement, and in a variety of special packaging applications. The products of the present invention may also be used in plastic compression molding and extrusion molding applications, where their crystalline nature, sharp melting point and marked fluidity, in the molten state, results in faithful reproduction of the mold. Molded products, for use as containers, may be produced from powders obtained pursuant to the present invention; and also, many mechanical and other engineering parts and materials, such as gears, cams, bearings, and similar machine components may be produced from them. In the electrical arts, the products of the present invention are useful as a coating on wire, etc., as an insulation, and for the production of certain mechanical, electrical parts, such as insulating bushings, fuse holders, and the like. The products are also of interest in the coating arts as finishes for textiles, paper and similar fibrous materials, and for use as special adhesives and other coatings.

It should also be understood that the polymeric products of the present invention may be compounded in many applications with other synthetic plastic materials, plasticizers and fillers. Among the plasticizers, which have been found to be compatible with the products of the present invention, may be mentioned, o- and p-toluenesulfonamide, N-ethyl o- and p-toluenesulfonamide, ethylene carbonate and propylene carbonate.

While the production of polymers of 2-pyrrolidone and 2-piperidone has specifically been described in the foregoing examples it will be apparent that the process of the present invention may be employed for the production of polymers of homologues of 2-pyrrolidone and 2-piperidone which contain a lower alkyl (1–4 carbon atoms) substituent on the carbon atoms in the ring. Such alkyl substituted pyrrolidones and piperidones which have been found to be most readily polymerized by the process of this invention are those in which certain alkyl substituents in 3 and 4 position such as 3-methyl-2-pyrrolidone, 4-methyl-2-pyrrolidone, 4-ethyl-2-pyrrolidone, 3,3-dimethyl-2-pyrrolidone, 4,4-dimethyl-2-pyrrolidone, 3-methyl-2-piperidone, and 3-ethyl-2-piperidone. The alkyl substituted pyrrolidones and piperidones may be represented by the general formula

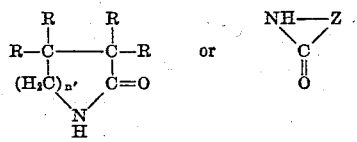

wherein Z represents

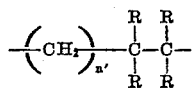

where $n'$ is one of the integers 1 and 2 and the R's represent a member of the group consisting of H and lower alkyl groups of 1 to 4 carbon atoms. The polymeric unit of the polymers produced on polymerizing them in accordance with the present invention may thus be represented by the general formula

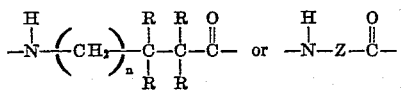

We claim:
1. In the process of polymerizing lactams of the formula

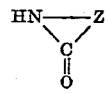

wherein Z represents

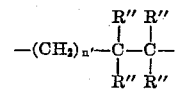

where
$n'$ is an integer from 1 to 2 and
R″ represents a member of the group consisting of hydrogen and lower alkyl radicals of 1 to 4 carbon atoms, comprising effecting said polymerization in the presence of a minor amount up to about 10 mole percent based on said lactam of the alkali metal lactam as the polymerization catalyst; the improvement which comprises effecting said polymerization under essentially anhydrous conditions in the presence of a minor amount up to about 10 mole percent based on said lactam of a N-imino pyrrolidone selected from the group consisting of N-iminopyrrolidones of the formula

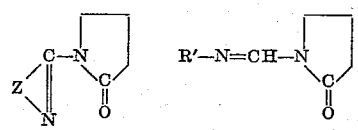

and

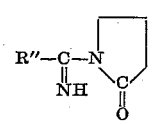

wherein R″ represents a member of the group consisting of aryl, aralkyl and lower 1 to 4 carbon atom alkyl groups, R′ represents an aryl group and Z represents an alkylene group of 3 to 5 carbon atoms.

2. In the process of polymerizing pyrrolidone wherein pyrrolidone is polymerized in the presence of a minor amount up to about 10 mole percent based on said pyrrolidone of alkali metal pyrrolidone as the polymerization catalyst; the improvement which comprises effecting said polymerization under essentially anhydrous conditions and in the presence of a minor amount up to about 10 mole percent based on said pyrrolidone of an N-imino pyrrolidone selected from the group consisting of N-imino pyrrolidones of the formula

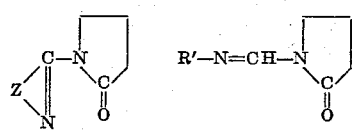

and

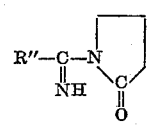

wherein R″ represents a member of the group consisting of aryl, aralkyl and lower 1 to 4 carbon atom alkyl groups, R′ represents an aryl group and Z represents an alkylene group of 3 to 5 carbon atoms.

3. The process as defined in claim 2 wherein the N- imino pyrrolidone specified is N-(2-butyrolactim)-2-pyrrolidone.

4. The process as defined in claim 2 wherein the N-imino pyrrolidone specified is N-(2-caprolactim)-2-pyrrolidone.

5. In the process of polymerizing piperidone under essentially anhydrous conditions wherein piperidone is polymerized in the presence of a minor amount up to about 10 mole percent based on said piperidone of alkali metal piperidone as the polymerization catalyst; the improvement which comprises effecting said polymerization in the presence of a minor amount up to about 10 mole percent based on said piperidone of a N-imino pyrrolidone selected from the group consisting of N-imino pyrrolidones of the formula

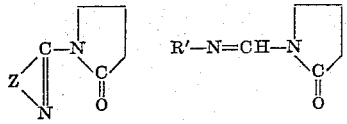

and

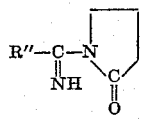

wherein R″ represents a member of the group consisting of hydrogen and aryl aralkyl and lower 1 to 4 carbon atom alkyl groups, R′ represents an aryl group and Z represents an alkylene group of 3 to 5 carbon atoms.

6. The process as defined in claim 5 wherein the N-imino pyrrolidone specified is N-(2-caprolactim)-2-pyrrolidone.

7. N-imino pyrrolidones selected from the group consisting of N-iminopyrrolidones of the formula

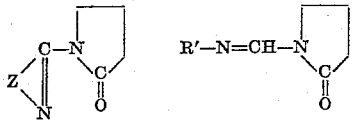

and

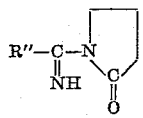

wherein R′ represents a member of the group consisting of aryl aralkyl and lower 1 to 4 carbon atom alkyl groups, R′ represents an aryl group and Z represents an alkylene group of 3 to 5 carbon atoms.

8. N-(2-butyrolactim)-2-pyrrolidone.
9. N-(2-caprolactim-2-pyrrolidone.
10. N-(benzimino)-2-pyrrolidone.
11. N-(valerimino)-2-pyrrolidone.
12. The process of producing N-imino pyrrolidones of the formula

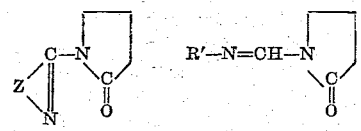

and

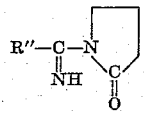

wherein R″ represents a member of the group consisting of hydrogen and aryl aralkyl and lower 1 to 4 carbon atom alkyl groups, R′ represents an aryl group and Z represents an alkylene group of 3 to 5 carbon atoms, comprises condensing pyrrolidone with an imido ether selected from the group consisting of N-imino pyrrolidones of the formula

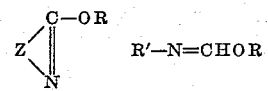

and

wherein Z, R′ and R″ are as defined above, by heating a mixture of the same and removing the alcohol formed.

13. The process of producing N-(2-butyrolactim)-2-pyrrolidone which comprises heating a mixture of pyrrolidone and an O-(alkyl group of 1 to 4 carbon atoms) butyrolactim and removing the alcohol formed.

14. The process of producing N-(2-caprolactim)-2-pyrrolidone which comprises heating a mixture of pyrrolidone and an O-(alkyl group of 1 to 4 carbon atoms) caprolactim and removing the alcohol formed.

15. The process of producing N-(benzimino)-2-pyrrolidone which comprises heating a mixture of pyrrolidone and an O-(alkyl group of 1 to 4 carbon atoms) benzimidate and removing the alcohol formed.

16. The process of producing N-(valerimino)-2-pyrrolidone which comprises heating a mixture of pyrrolidone and an O-(alkyl group of 1 to 4 carbon atoms) n-valerimidate and removing the alcohol formed.

17. The process of producing N-(N-phenylformimino)-2-pyrrolidone which comprises heating a mixture of pyrrolidone and an O-(alkyl group of 1 to 4 carbon atoms) N-phenylformimidate and removing the alcohol formed.

References Cited in the file of this patent

UNITED STATES PATENTS

| | | |
|---|---|---|
| 2,638,463 | Ney et al. | May 12, 1953 |
| 2,809,958 | Barnes et al. | Oct. 15, 1957 |